(12) United States Patent
Albers

(10) Patent No.: US 7,195,187 B2
(45) Date of Patent: Mar. 27, 2007

(54) ROLLING MILL SYSTEM

(76) Inventor: August Albers, Längenhardstr. 22a, Freiburg (DE) 79104

( * ) Notice: Subject to any disclaimer, the term of this patent is extended or adjusted under 35 U.S.C. 154(b) by 201 days.

(21) Appl. No.: 10/487,425

(22) PCT Filed: Aug. 31, 2001

(86) PCT No.: PCT/EP01/10048

§ 371 (c)(1),
(2), (4) Date: Feb. 23, 2004

(87) PCT Pub. No.: WO03/018277

PCT Pub. Date: Mar. 6, 2003

(65) Prior Publication Data

US 2004/0217221 A1 Nov. 4, 2004

(51) Int. Cl.
*B02C 4/08* (2006.01)
*B02C 4/44* (2006.01)
*B02C 4/02* (2006.01)

(52) U.S. Cl. .................. 241/235; 241/66; 241/221; 241/227; 241/236

(58) Field of Classification Search ........ 241/220–236, 241/66
See application file for complete search history.

(56) References Cited

U.S. PATENT DOCUMENTS

| 2,434,938 | A | * | 1/1948 | Latture | 241/236 |
| 3,406,624 | A | * | 10/1968 | Kutchera et al. | 100/176 |
| 3,548,742 | A | * | 12/1970 | Seufert et al. | 100/95 |
| 3,862,721 | A | * | 1/1975 | Flair | 241/236 |
| 3,993,291 | A | | 11/1976 | Brinkman | 259/185 |
| 4,294,414 | A | * | 10/1981 | Gerstenberg | 241/222 |
| 4,605,309 | A | * | 8/1986 | Albers | 366/76.1 |
| 4,773,762 | A | * | 9/1988 | Albers | 366/69 |

FOREIGN PATENT DOCUMENTS

| DE | 30 24 552 | 1/1982 |
| DE | 43 30 090 | 4/1994 |
| DE | 43 34 697 | 4/1995 |
| EP | 0 324 800 | 7/1989 |
| GB | 672 668 | 5/1952 |

* cited by examiner

*Primary Examiner*—Lowell A. Larson
*Assistant Examiner*—Jason Y. Pahng
(74) *Attorney, Agent, or Firm*—Gudrun E. Huckett

(57) ABSTRACT

A rolling mill system has oppositely driven, temperature-controlled first and second rolls, each having a first roll half with a first end face, a second roll half with a second end face, and a roll center. The first roll has a peripheral surface with open grooves arranged on the first and second roll halves and with ribs between the grooves. The grooves of the roll halves are arranged opposed to one another at an obtuse angle and symmetrically to the roll center. The width of the ribs is smaller than the width of the grooves. The grooves extend continuously between the end faces. The second roll has a smooth peripheral surface. First and second cutting devices are arranged at the first and second end faces of the first roll, respectively. The cutting devices are arranged near open ends of the grooves.

6 Claims, 3 Drawing Sheets

ROLLING MILL SYSTEM

BACKGROUND OF THE INVENTION

The invention relates to a rolling mill system comprising two oppositely driven and temperature-controlled rolls and at least one cutting device, wherein at least one roll, comprising a first roll half, a second roll half, and a roll center, is provided on each half with open grooves and ribs remaining between the grooves.

Such a rolling mill system is disclosed in EP 0 231 398. This rolling mill system is a continuous mixing and shearing rolling mill system for shearing and simultaneously transporting by means of grooves a material that can be plasticized. By means of a strip cutting roller, material is removed in the form of strips that are subsequently cut by a transverse cutting device to granules. Disadvantageously, the manufacture of granules is relatively complex with this rolling mill system.

Other rolling mill systems with shearing action on the material as a result of grooves provided on peripheral surfaces of two rolls are disclosed in EP 0 148 966, EP 0 324 800, DE 43 30 090 C2, DE 43 34 697 A1, and DE-OS 23 56 201.

SUMMARY OF THE INVENTION

The object of the invention resides in that the rolling mill system of the aforementioned kind is to be further developed so that an optimal manufacture of granules can be achieved.

For solving this object, it is proposed according to the invention that the rolling mill system is characterized in that the grooves of the first roll half and the grooves of the second roll half are arranged opposed to one another at an obtuse angle and symmetrically to the roll center, wherein the width of the ribs is smaller than the width of the grooves and wherein on each end face of the roll a cutting device is provided.

Because of the special arrangement of grooves, the material is transported quickly to the two end faces of the roll. During transport, the ribs act as cooling ribs. Since the width of the ribs is smaller than the width of the grooves, practically no shearing action is caused when rotating the rolls but only a transport action; this makes the rolling mill system particularly effective. Accordingly, in a very short period of time a large amount of material can be transported outwardly by means of the grooves and can be processed to granules by means of the cutting devices. In this way, overall an optimal manufacture of granules can be achieved by means of the rolling mill system according to the invention The grooves can extend across the entire width of each roll half beginning at the roll center and reaching to the end face of the roll, respectively. However, it is also conceivable to have the grooves extend only across a certain partial area of the width of each roll half. This partial area is the edge area of each roll half that is associated with the respective end face. The remaining area free of grooves of each roll half is then smooth. The length of the grooves matches in such an embodiment approximately one quarter of the corresponding roll diameter.

The material to be processed is filled into the roll nip between the two rolls. In order to always provide sufficient material for processing, a special embodiment of the invention provides that the peripheral surface of at least one roll is provided with a recess in the area of the roll center. The recess extends over the entire circumference of the roll and can be curved or rectangular when viewed in the direction of the axis of rotation of the roll. The grooves that extend from the roll center to the end faces are advantageously arranged relative to the axis of rotation of the roll at an angle of up to 45°. In this way, between oppositely positioned rolls of the individual roll halves an angle of 180° to 90° is produced. The width of the ribs is between 0.5 times to a little less than 1 time the width of the grooves.

BRIEF DESCRIPTION OF THE DRAWINGS

The invention will be explained in more detail in the following with the aid of the drawing. The drawing shows one embodiment of the invention. It is shown in.

DESCRIPTION OF PREFERRED EMBODIMENTS

Figure 2:
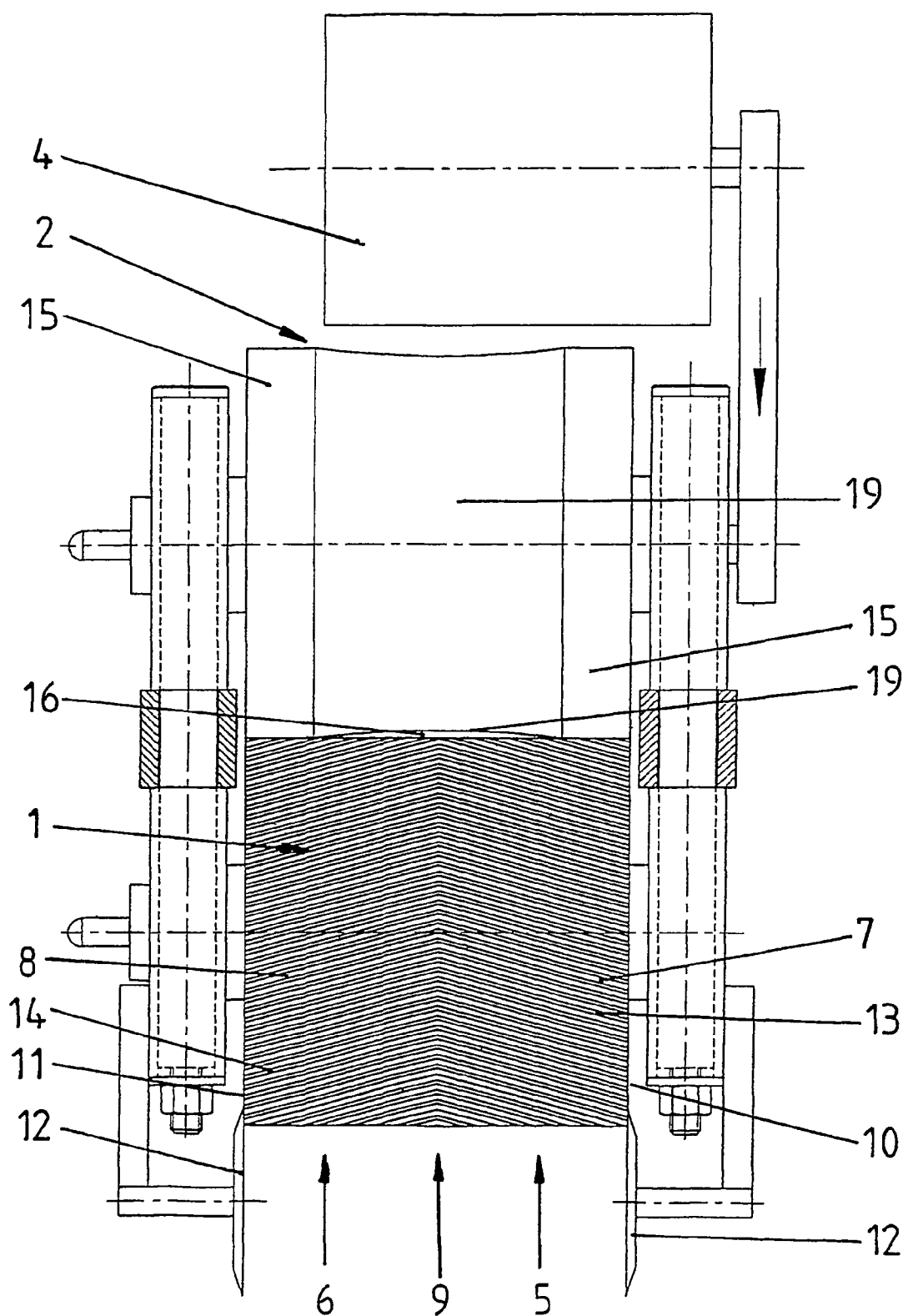
FIG. 2 a plan view according to FIG. 1.

The rolling mill system according to the invention has two rolls 1, 2 having axes that are parallel to one another and being rotatably supported on a frame 3 provided with a drive motor 4 that is speed-controlled. The roll 1 can be driven by the roll 2 by means of a gear pair, wherein the roll 1 acts as a so-called working roll and the roll 2 as a so-called counter roll. On the roll surface of the roll 1, on the first (right) roll half 5 and on the second (left) roll half 6 open grooves 7, 8 are arranged on each half, respectively. The peripheral surface of the roll 2 is usually of a smooth configuration. The grooves 7 of the first roll half 5 and the grooves 8 of the second roll half 6 of the roll 1 meet at the roll center 9 at an obtuse angle wherein the grooves 7, 8, as illustrated in FIG. 2, extends continuously from the first end face 10 of the first roll half 5 to the second end face 11 of the second roll half 6. At each end face 10, 11 of the roll 1 a cutting device 12 is provided in the area of the open ends of the grooves 7, 8. The cutting device 12 is a rotating disk knife that is spring-adjusted against the end faces 10, 11. The grooves 7, 8 are uniformly distributed about the periphery of the roll 1, have a width of between 0.5 mm and 10 mm, preferably between 1 mm and 8 mm, and have a depth of between 0.5 mm and 20 mm. The groove depth of the roll 1 corresponds at least to the groove width. It is maximally three times the groove width. The groove depth can increase up to twice the initial value from the product feed at the roll center 9 to the product exit at the two end faces 10, 11 of the roll 1. In this way, in an embodiment of a roll with a diameter of 200 mm the groove depth can be 2 mm in the area of the roll center 9 and 4 mm at the edge of the roll. Between the grooves 7, 8, metal ribs 13, 14 are arranged that extend parallel to the grooves. The width of the ribs 13, 14 is smaller than the width of the grooves 7, 8. Preferably, the width of the ribs 13, 14 is between 0.5 times and less than 1 time the width of the grooves. Each groove 7, 8 can be, for example, 3 mm wide and each rib 13, 14 can be 2 mm wide. The groove shape is formed by two lateral parallel extending sidewalls and passes into a semi-round shape at the base. A dovetail-shaped widening of the groove up to the base of the groove is advantageous. In order for the material to be interlocked within the grooves, the cross-section of the groove shape can also be V-shaped or of another shape that is beneficial for material transport.

The grooves 7, 8 are arranged at a slant and are positioned at an angle of 20° relative to the axis of rotation of the roll 1 or at a corresponding angle of 70° relative to the axis of the roll center 9. The conceivable angle range for the grooves 7, 8 can be from 0° up to 45° relative to the axis of rotation or from 90° up to 45° relative to the axis of the roll center 9.

Figure 1:
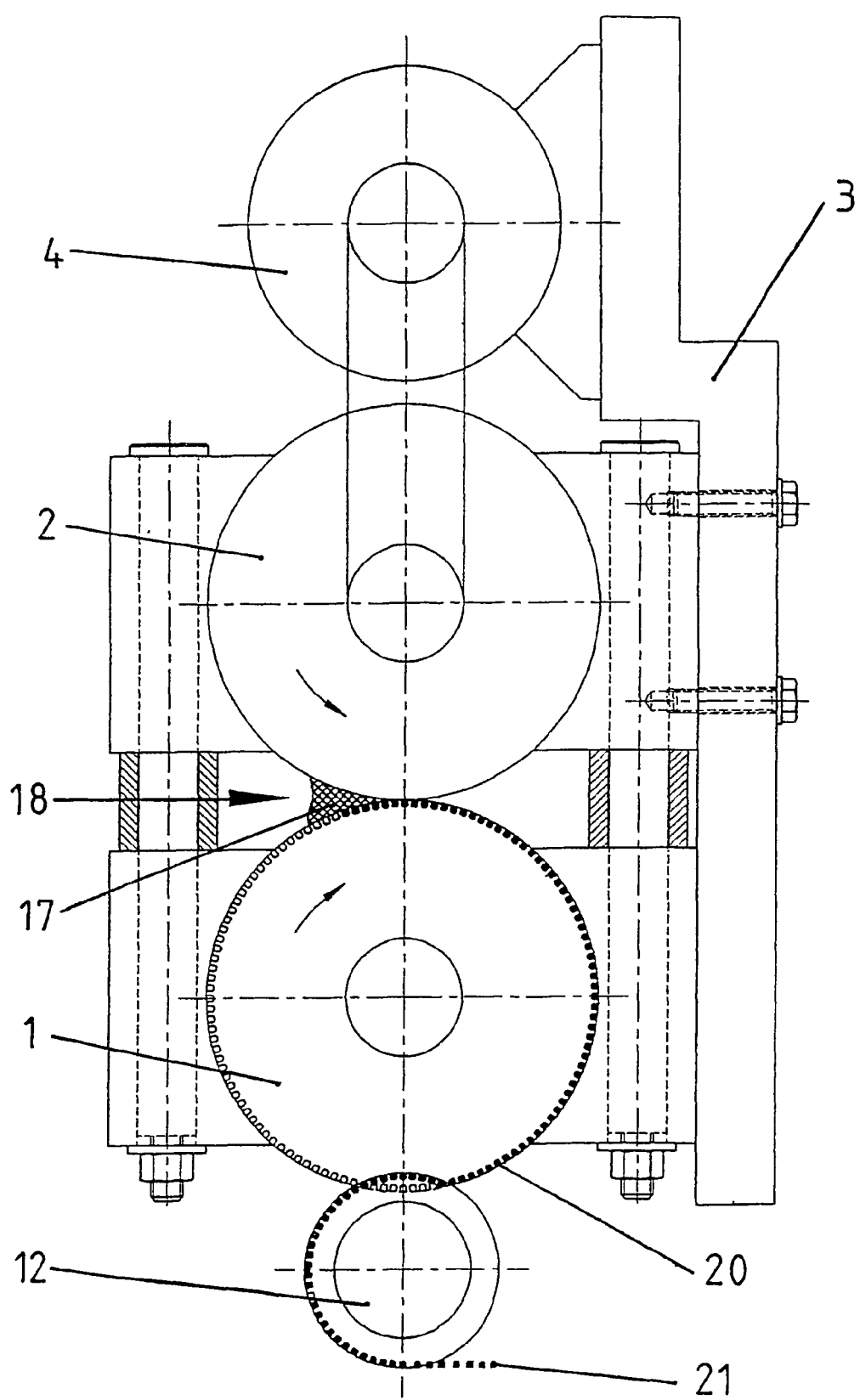
FIG. 1 a side view.

The length of the grooves 7, 8, which, according to one embodiment, are arranged in a partial area of the width of each roll half 5, 6 in the vicinity of both end faces 10, 11 of the roll 1, is at least 10 mm and, depending on the diameter of the roll, is up to 150 mm. In this connection, the length of the grooves corresponds to approximately a quarter of the respective diameter of the roll. The remaining groove-free area of the roll 1 is smooth. In the illustrated embodiment according to FIG. 1, the grooves 7, 8 extend from the roll center 9 across the entire width of each roll half 5, 6 to the respective end faces 10, 11.

The roll 1 has across the entire length a cylindrical surface; the roll 2 has a special surface contour or recess 19. Beginning at the two ends of the roll 2, a cylindrical area 15 is provided, respectively, opposite the half-open grooves 7, 8 arranged on the roll 1. This cylindrical area 15 of the surface contour of the roll 2 forms together with the metal ribs 13, 14 of the roll 1 a roll nip 16 close to zero between the rolls 1 and 2 and closes the half-open grooves 7, 8 when passing through the roll nip. This cylindrical area 15 of the roll 2, depending on the roll diameter, has a length of 10 mm to 150 mm. In the embodiment having a roll diameter of 200 mm, the cylindrical area 15 has a length of approximately 50 mm.

Figure 3:
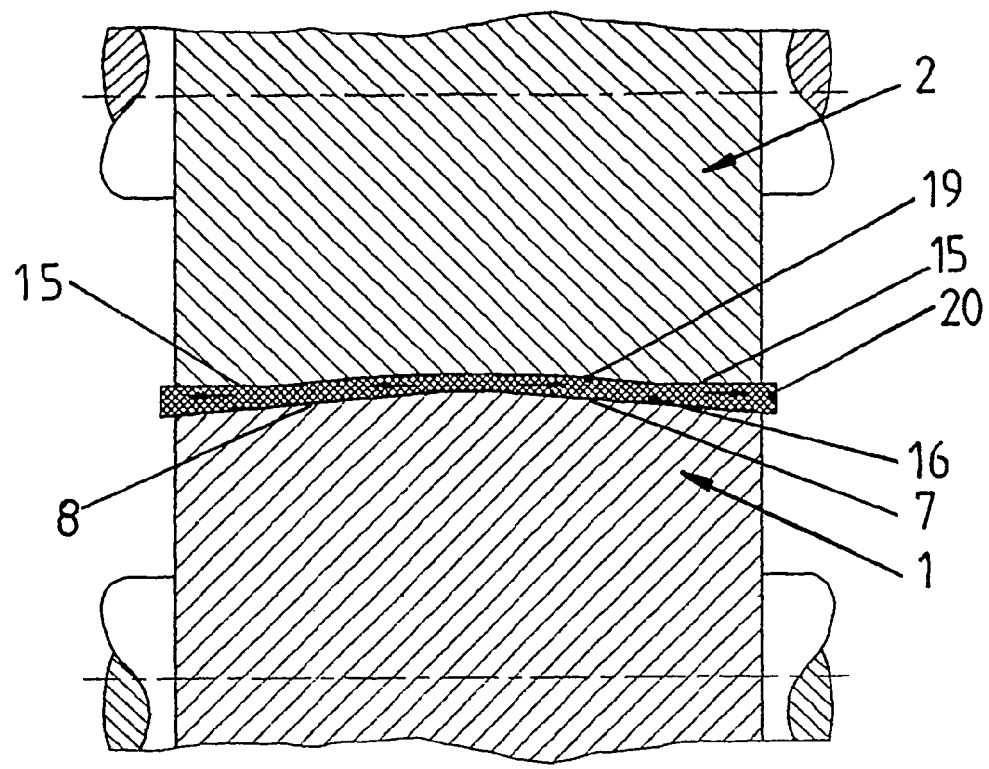
FIG. 3 a broken-off cross-section view of the two rolls with roll nip according to FIG. 1.
Figure 4:
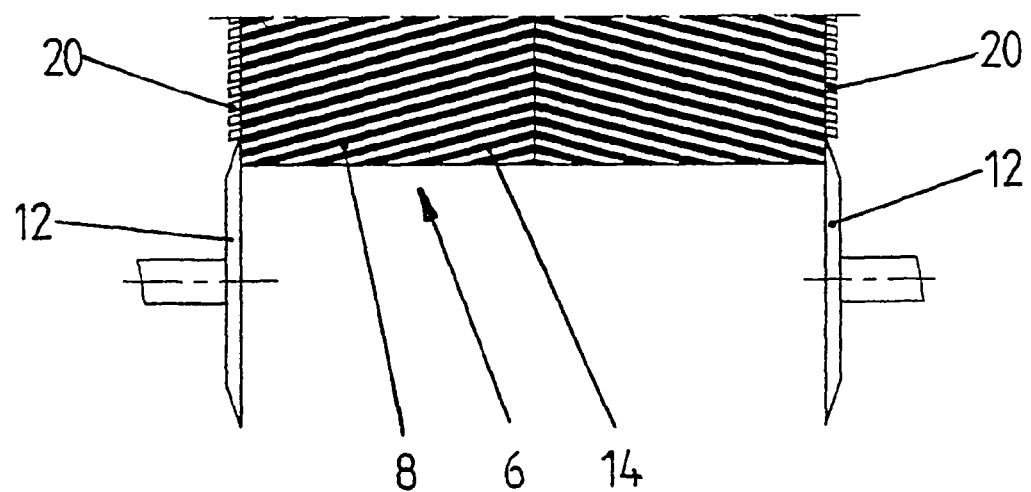
FIG. 4 a broken-off plan view onto a roll having a cutting device according to FIG. 1.

In FIG. 3, schematically a section of the roll nip 16 formed between the rolls 1 and 2 is illustrated in the area of the grooves 7, 8. A product 17 is fed to the roll nip 16 by means of an external feed opening 18. Downstream of the cylindrical area 15 of the surface contour of the roll 2 in the direction toward the roll center 9, a conically decreasing diameter or recess 19 of the roll 2 is provided so that in this area an enlargement of the roll nip 16 from near zero to a predetermined value between 1 mm and maximally approximately 20 mm, preferably between 2 mm and 5 mm, is provided at the roll center 9. The surface contour or recess 19 in the area of the roll center 9 can be arc-shaped, as illustrated in FIG. 2, but also rectangular or roof-shaped or can have any other suitable shape. This transition area between the two cylindrical areas 15 of the surface contour serves for guiding the product or plastic material 17 away from the roll center of the roll 2 into the grooves 7, 8. Moreover, the larger roll nip 16 provided at the roll center 2 enables build-up and stabilization of a material overlap of the product 17 that is fed onto the roll 1 from the exterior.

In an embodiment with a roll length of 200 mm, a roll diameter of 200 mm, and an angle of the grooves 7, 8 of 20° relative to the axis of rotation, the length of the grooves 7, 8 for each roll half 5, 6 is approximately 105 mm and the length of the cylindrical section 15 of the roll 2 for each roll half is approximately 50 mm. Across the total length of the grooves 7, 8, the groove depth increases from approximately 2 mm at the roll center 9 in the direction toward both end faces 10, 11 to approximately 4 mm.

When operating the rolling mill system according to the invention, the grooves 7, 8 arranged in the two roll halves 5, 6 of the roll 1 are filled with plastic material as a result of the pressure produced in the roll nip 16. Because of the oppositely turning rolls 1, 2, with each pass through the roll nip the excess amount of material 17 is pressed out of the openings of the grooves 7, 8 at the two end faces 10, 11 in the form of short strand sections 20. These strand sections 20 are then cut off by the two rotating disk knives 12 and are thrown off as granules 21. The granules 21 fall onto a riddle sifter or onto a fluidized bed, are mixed with already cooled-down granules in order to be subsequently stored in the solidified state in the corresponding storage containers. The shape of the half-open grooves 7, 8 determines the outer shape of the granules 21; the length of the pressed-out strand 20 provides its height. The length of the granules 21 is adjustable for a constant feed of the plasticized material by means of the rotational speed of the roll. In this connection, low rotational speeds provide longer strand sections, higher rotational speeds shorter strand sections 20. The rotational speed range for the rolling mill system according to the invention can be adjusted between 5 and 500 rpm.

The plasticized product 17 coming from the roll center 9 of the roll 1 must be temperature-controlled before entering the grooves 7, 8 such that on the roll 1 a visco-plastic material will form which is still deformable but firm with regard to cutting. The granules should not immediately stick together after the cutting process. An intensive temperature control of the two roll surfaces from the interior and/or from the exterior therefore serves for providing a fine adjustment of the product viscosity in the range of firmness for cutting the material. In the case of greater throughput quantities, an extended residence time on the roll or a larger roll diameter can be required for an exact temperature control of the product layer. Depending on the application, the length of the roll is accordingly 0.5 times up to 8 times the diameter of the roll. For longer rolls with a length of more than 1.5 times the roll diameter, the material transport is improved by the arrangement of flat mirror-symmetrically and oppositely oriented grooves on the surface of the roll 2. The grooves of the roll 2 are arranged relative to the grooves of the roll 1 mirror-symmetrically to the nip axis of the roll nip 16. These additional grooves on the roll 2 have the same angle relative to the axis of rotation, the same rib width, and the same groove width as the grooves 7, 8 on the roll 1, but they have a depth that is only approximately one third in comparison to the groove depth of the roll 1. For exact simultaneous rotation of both rolls 1, 2, the contours of the grooves 7, 8 in the roll 1 and the contour of the grooves in the roll 2 together provide the contour of the granules 21.

With the special oppositely oriented arrangement of the grooves 7, 8 on the two roll halves 5, 6 as well as a smaller width of the ribs 13, 14 relative to the width of the grooves 7, 8, an effective and fast transport of the material 17 to be processed is enabled to the cutting devices 12 where the material strand 20 is cut to form granules 21. In this way, the rolling mill system according to the invention is suitable in an optimal way for producing granules.

The invention claimed is:

1. A rolling mill system comprising:
a first roll and a second roll that are oppositely driven and temperature-controlled;
wherein the first and second rolls each comprise a first roll half having a first end face, a second roll half having a second end face, and a roll center;
wherein the first and second roll halves of the first roll have a peripheral surface provided with open grooves and ribs between the grooves;
wherein the grooves of the first roll half and the grooves of the second roll half are arranged at an obtuse angle opposed to one another and symmetric to the roll center, wherein the obtuse angle is defined by a groove of the first roll half and a groove of the second roll half and wherein a width of the ribs is smaller than a width of the grooves;

wherein the grooves of the roll extend continuously from the first end face to the second end face;

wherein the second roll has a peripheral surface that is smooth, wherein the peripheral surface of the second roll faces the peripheral surface of the first and second roll halves of the first roll;

a first cutting device arranged at the first end face of the first roll and a second cutting device arranged at the second end face of the first roll, wherein the first and second cutting devices are arranged in an area of open ends of the grooves;

wherein the peripheral surface of the second roll has cylindrical areas beginning at opposite ends of the second roll and extending toward the roll center:

wherein the peripheral surface of the second roll has a circumferential recess between the cylindrical areas;

wherein a roll nip is defined between the first and second rolls, wherein the roll nip is almost zero at the cylindrical areas and increases within the circumferential recess to maximally 20 mm at the roll center.

2. The rolling mill system according to claim 1, wherein the grooves are arranged at an angle of up to 45° relative to the direction of an axis of rotation of the first roll.

3. The rolling mill system according to claim 1, wherein the width of the ribs is between 0.5 and 1 times the width of the grooves.

4. The rolling mill system according to claim 1, wherein the grooves have a width of between 0.5 mm and 10 mm and a depth of between 0.5 mm and 20 mm, wherein the depth of the grooves matches at least the width of the grooves.

5. The rolling mill system according to claim 1, wherein the depth of the grooves increases from the roll center up to the first and second end faces.

6. The rolling mill system according to claim 1, wherein the first and second cutting devices each comprise a disk knife that is spring-adjusted against the first or second end face, respectively.

* * * * *